United States Patent
Koyama et al.

(10) Patent No.: US 8,928,708 B2
(45) Date of Patent: Jan. 6, 2015

(54) DISPLAY DEVICE AND METHOD FOR DRIVING THE DISPLAY DEVICE

(75) Inventors: Jun Koyama, Kanagawa (JP); Hiroyuki Miyake, Kanagawa (JP); Kouhei Toyotaka, Kanagawa (JP); Hikaru Harada, Aichi (JP); Makoto Kaneyasu, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 146 days.

(21) Appl. No.: 13/545,734

(22) Filed: Jul. 10, 2012

(65) Prior Publication Data

US 2013/0016143 A1    Jan. 17, 2013

(30) Foreign Application Priority Data

Jul. 15, 2011    (JP) ................. 2011-156196

(51) Int. Cl.
*G09G 5/02*    (2006.01)
*G09G 3/00*    (2006.01)

(52) U.S. Cl.
CPC ........ *G09G 3/003* (2013.01); *G09G 2320/0209* (2013.01)
USPC ....................................... 345/697

(58) Field of Classification Search
None
See application file for complete search history.

(56) References Cited

U.S. PATENT DOCUMENTS

| | | |
|---|---|---|
| 6,377,230 B1 | 4/2002 | Yamazaki et al. |
| 6,597,348 B1 | 7/2003 | Yamazaki et al. |
| 6,882,012 B2 | 4/2005 | Yamazaki et al. |
| 7,145,536 B1 | 12/2006 | Yamazaki et al. |
| 7,193,593 B2 | 3/2007 | Koyama et al. |
| 7,224,339 B2 | 5/2007 | Koyama et al. |
| 7,268,756 B2 | 9/2007 | Koyama et al. |
| 7,317,438 B2 | 1/2008 | Yamazaki et al. |
| 7,385,579 B2 | 6/2008 | Satake |
| 7,425,937 B2 | 9/2008 | Inukai |
| 7,791,571 B2 | 9/2010 | Ohtani et al. |
| 2005/0012097 A1 | 1/2005 | Yamazaki |
| 2006/0050385 A1* | 3/2006 | Uehara et al. ............ 359/465 |
| 2007/0152921 A1 | 7/2007 | Osame |
| 2007/0279359 A1 | 12/2007 | Yoshida et al. |
| 2007/0279374 A1 | 12/2007 | Kimura et al. |
| 2009/0243961 A1* | 10/2009 | Momose .................. 345/1.3 |

(Continued)

FOREIGN PATENT DOCUMENTS

| | | |
|---|---|---|
| CN | 101938666 | 1/2011 |
| JP | 08-036145 A | 2/1996 |

(Continued)

*Primary Examiner* — Amr Awad
*Assistant Examiner* — Andre Matthews
(74) *Attorney, Agent, or Firm* — Eric J. Robinson; Robinson Intellectual Property Law Office, P.C.

(57) ABSTRACT

An object is to suppress crosstalk. A display device includes a pixel portion which includes a first display region, a second display region, and a non-light-emitting region provided between the first display region and the second display region; and a parallax barrier which includes a first light control region, a second light control region, and a light-transmitting region provided between the first light control region and the second light control region. The first light control region overlaps with the first display region, the second light control region overlaps with the second display region, and the center of the width of the light-transmitting region overlaps with the non-light-emitting region.

12 Claims, 9 Drawing Sheets

(56) References Cited

U.S. PATENT DOCUMENTS

| | | |
|---|---|---|
| 2009/0321737 A1 | 12/2009 | Isa et al. |
| 2010/0148177 A1 | 6/2010 | Koyama et al. |
| 2010/0182282 A1 | 7/2010 | Kurokawa et al. |
| 2010/0328438 A1 | 12/2010 | Ohyama et al. |
| 2011/0157168 A1 | 6/2011 | Bennett et al. |
| 2011/0242100 A1 | 10/2011 | Yamazaki et al. |
| 2012/0206503 A1 | 8/2012 | Hirakata et al. |
| 2012/0320011 A1 | 12/2012 | Koyama |

FOREIGN PATENT DOCUMENTS

| | | |
|---|---|---|
| JP | 2003-259395 A | 9/2003 |
| JP | 2004-294914 A | 10/2004 |
| JP | 2010-073881 A | 4/2010 |
| JP | 2010-113344 A | 5/2010 |
| JP | 2010-128306 A | 6/2010 |
| JP | 2010-251156 A | 11/2010 |
| JP | 2011-013778 A | 1/2011 |

* cited by examiner

DISPLAY DEVICE AND METHOD FOR DRIVING THE DISPLAY DEVICE

BACKGROUND OF THE INVENTION

1. Field of the Invention

An embodiment of the present invention relates to a display device.

2. Description of the Related Art

In recent years, development of display devices which can display pseudo three-dimensional (3D) images has been progressed.

For the above display devices, for example, a method using parallax barrier (parallax barrier method) and the like can be used (e.g., Patent Document 1).

The parallax barrier method makes a viewer perceive a two-dimensional image as a three-dimensional image by utilizing parallax between the left eye and the right eye. The display device using the parallax barrier method includes a pixel portion and a parallax barrier. In the display device using the parallax barrier method, for example, an image for the right eye (right-eye image) and an image for the left eye (left-eye image) are displayed on the pixel portion, and the parallax barrier functions to prevent light for the left-eye image from entering the right eye and to prevent light for the right-eye image from entering the left eye. Thus, a two-dimensional image can be perceived as a pseudo three-dimensional image.

REFERENCE

[Patent Document 1] Japanese Published Patent Application No. 2010-113344

SUMMARY OF THE INVENTION

However, the conventional display device using the parallax barrier method has difficulty in making a viewer perceive a pseudo three-dimensional image unless the distance between the viewer and the display device falls within the predetermined range.

For example, when the distance between the viewer and the display device is closer or more distant than the predetermined distance, light for the right-eye image enters the left eye and light for the left-eye image enters the right eye. Thus, crosstalk is generated, and it is difficult to perceive a pseudo three-dimensional image.

An object of one embodiment of the present invention is to suppress crosstalk.

In one embodiment of the present invention, a non-light-emitting region with a predetermined width is provided between a plurality of display regions in a pixel portion, whereby crosstalk is suppressed, and the range of distance between a viewer and a display device, which enables the viewer to perceive a pseudo three-dimensional image, is expanded.

One embodiment of the present invention is a display device including a pixel portion which includes a first display region, a second display region, and a non-light-emitting region, and a parallax barrier which includes a first light control region, a second light control region, and a light-transmitting region. In the pixel portion, the non-light-emitting region is provided between the first display region and the second display region, and a width of the non-light-emitting region is greater than or equal to 30% and less than or equal to 70% of a width of a pixel in the direction parallel to the width direction of the non-light-emitting region. The first light control region overlaps with the first display region, the second light control region overlaps with the second display region, the light-transmitting region is provided between the first light control region and the second light control region, and a center of the width of the light-transmitting region overlaps with the non-light-emitting region.

According to one embodiment of the present invention, even when the distance between a viewer and a display device is changed, crosstalk can be reduced. Thus, the range of distance between a viewer and a display device, which enables the viewer to perceive a pseudo three-dimensional image, can be expanded.

DETAILED DESCRIPTION OF THE INVENTION

Examples of embodiments describing the present invention will be described with reference to the drawings below. Note that it will be readily appreciated by those skilled in the art that details of the embodiments can be modified in various ways without departing from the spirit and scope of the present invention. The present invention is therefore not limited to the following description of the embodiments.

Note that the contents in different embodiments can be combined with one another as appropriate. In addition, the contents in different embodiments can be interchanged one another.

Ordinal numbers such as "first" and "second" are used in order to avoid confusion among components and the number of components is not limited by the number of ordinal numbers.

Embodiment 1

In this embodiment, examples of display devices which can display pseudo three-dimensional images will be described.

An example of a display device in this embodiment is described with reference to FIGS. 1A and 1B.

Figure 1A:
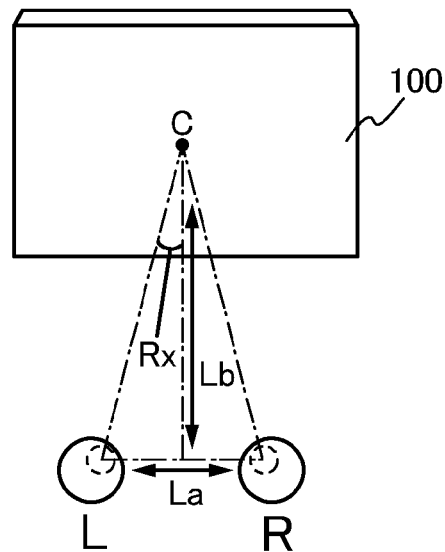
FIGS. 1A and 1B are diagrams illustrating an example of a display device according to Embodiment 1.

FIG. 1A is a schematic view illustrating a state where a viewer looks at a central portion C of the pixel portion in a display device 100. In this schematic view, La indicates a distance between the left eye L and the right eye R of the viewer, Lb indicates a distance between the viewer and the display device, and Rx indicates an angle between the central portion C and the left eye L or the right eye R.

Figure 1B:
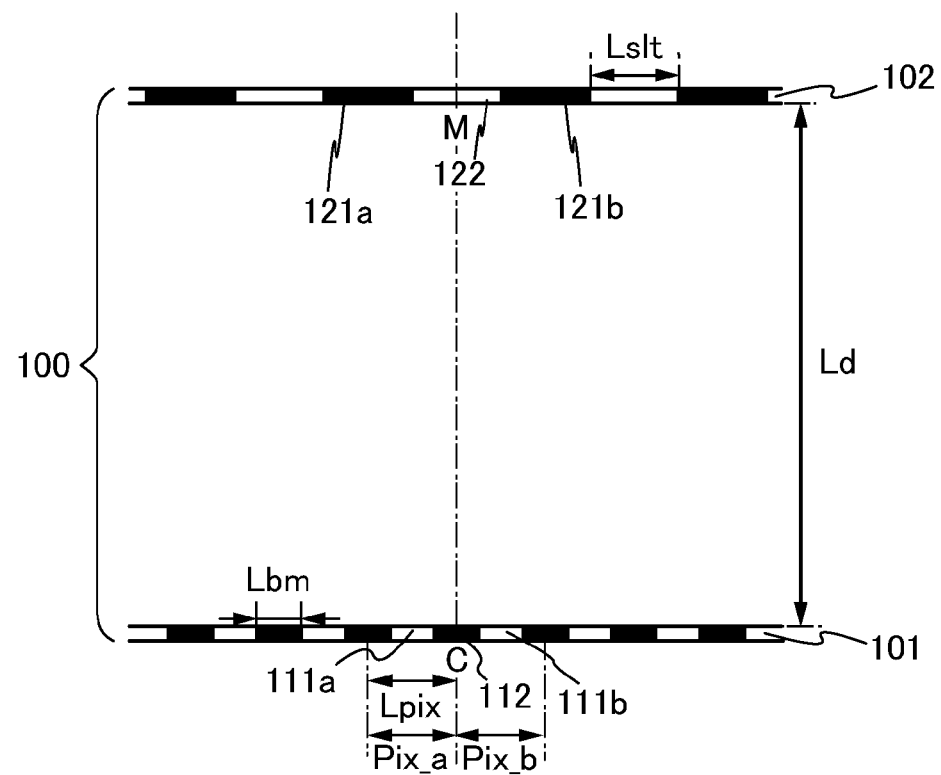

FIG. 1B is a cross-sectional schematic view of the display device 100. The display device 100 includes a pixel portion 101 and a parallax barrier 102. Note that the distance between the pixel portion 101 and the parallax barrier 102 is represented by Ld.

The pixel portion 101 includes a display region 111a, a display region 111b, and a non-light-emitting region 112 provided between the display region 111a and the display region 111b. Note that in FIG. 1B cross sections of the display region 111a, the display region 111b, and the non-light-emitting region 112 in the width direction are shown.

The display region 111a and the display region 111b are each a region which is provided in a pixel and displays images. For example, in the case where the display device 100 is a liquid crystal display device, a region provided with a liquid crystal element functions as a display region. In the case where the display device 100 is an electroluminescence display device (also referred to as EL display device), a region provided with a light-emitting element functions as a display region.

The non-light-emitting region 112 is a region which does not emit light or a region which blocks light. For example, in the case where the display device 100 is a liquid crystal display device or an EL display device, a region provided with a wiring, a region provided with a light-blocking layer, or a region which does not emit light and which light from the outside does not enter functions as a non-light-emitting region.

Further, as illustrated in FIG. 1B, the non-light-emitting region 112 may be provided to extend to a pixel Pix_a and a pixel Pix_b. In this case, the Pix_a includes the display region 111a and part of the non-light-emitting region 112, and the pixel Pix_b includes the display region 111b and part of the non-light-emitting region 112.

Considering Lb in the case where a viewer looks at the display device which is held in his/her hand, the width of the non-light-emitting region 112 is preferably set within the predetermined range. For example, when the width of the non-light-emitting region 112 is represented by Lbm and the width of the pixel in a direction parallel to the width direction of the non-light-emitting region is represented by Lpix, it is preferable that Lbm be greater than or equal to 30% and less than or equal to 70% of Lpix, greater than or equal to 40% and less than or equal to 60% of Lpix, or 50% of Lpix. Specifically, when Lpix is 100 µm for example, Lbm is greater than or equal to 30 µm and less than or equal to 70 µm. Although it is possible to narrow Lbm to 5 µm to 7 µm, Lbm in the display device according to this embodiment is set within the above range, whereby generation of crosstalk can be suppressed.

The parallax barrier 102 includes a light control region 121a, a light control region 121b, and a light-transmitting region 122 as illustrated in FIG. 1B. Note that in FIG. 1B, cross sections of the light control region 121a, the light control region 121b, and the light-transmitting region 122 in the width direction are shown.

As the parallax barrier 102, for example, a parallax barrier provided with a fixed slit, a parallax barrier provided with a plurality of liquid crystal shutters for forming a slit, or the like can be used.

The light control region 121a and the light control region 121b are regions which control light transmission. In the parallax barrier 102, the light control region 121a and the light control region 121b can function as light-blocking regions.

The light-transmitting region 122 is a region which transmits light. The width of the light-transmitting region 122 is represented by Lslt. Further, the center (M) of the width of the light-transmitting region 122 overlaps with the non-light-emitting region 112 in the pixel portion 101.

In the case, for example, where a left-eye image is displayed on the display region 111a and a right-eye image is displayed on the display region 111b with use of a structure where the center of the width of the light-transmitting region 122 overlaps with the non-light-emitting region 112, light for the left-eye image is less likely to enter the right eye, and light for the right-eye image is less likely to enter the left eye. Thus, even when the distance between a viewer and the display device 100 is changed, generation of crosstalk can be suppressed. Further, the center (M) of the width of the light-transmitting region 122 overlaps with the central portion of the width of the non-light-emitting region 112 in the pixel portion 101, whereby generation of crosstalk can be further suppressed.

In the case where the display device 100 is an EL display device, even if the area of the non-light-emitting region 112 is increased, an increase in power consumption can be suppressed. This is because in the EL display device, when the area of the display region is reduced due to the non-light-emitting region, the current density per unit area is increased, and accordingly emission luminance is less decreased. Thus, for example, the center of the width of the light-transmitting region 122 is provided to overlap with the non-light-transmitting region 112 (preferably, the central portion of the non-light-emitting region 112), and the width of the non-light-emitting region 112 is set within the above range, whereby an increase in power consumption is suppressed and crosstalk can be reduced.

Further, in the display device illustrated in FIGS. 1A and 1B, the case where an image displayed on the pixel portion 101 is actually viewed is described specifically with reference to FIGS. 2A and 2B, FIGS. 3A and 3B, and FIGS. 4A and 4B.

Figure 2A:
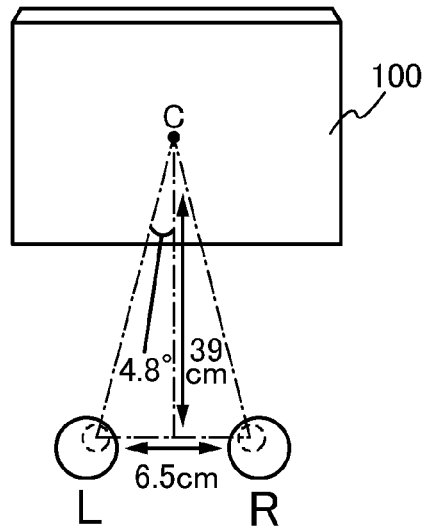
FIGS. 2A and 2B are diagrams illustrating an example of a display device according to Embodiment 1.
Figure 2B:
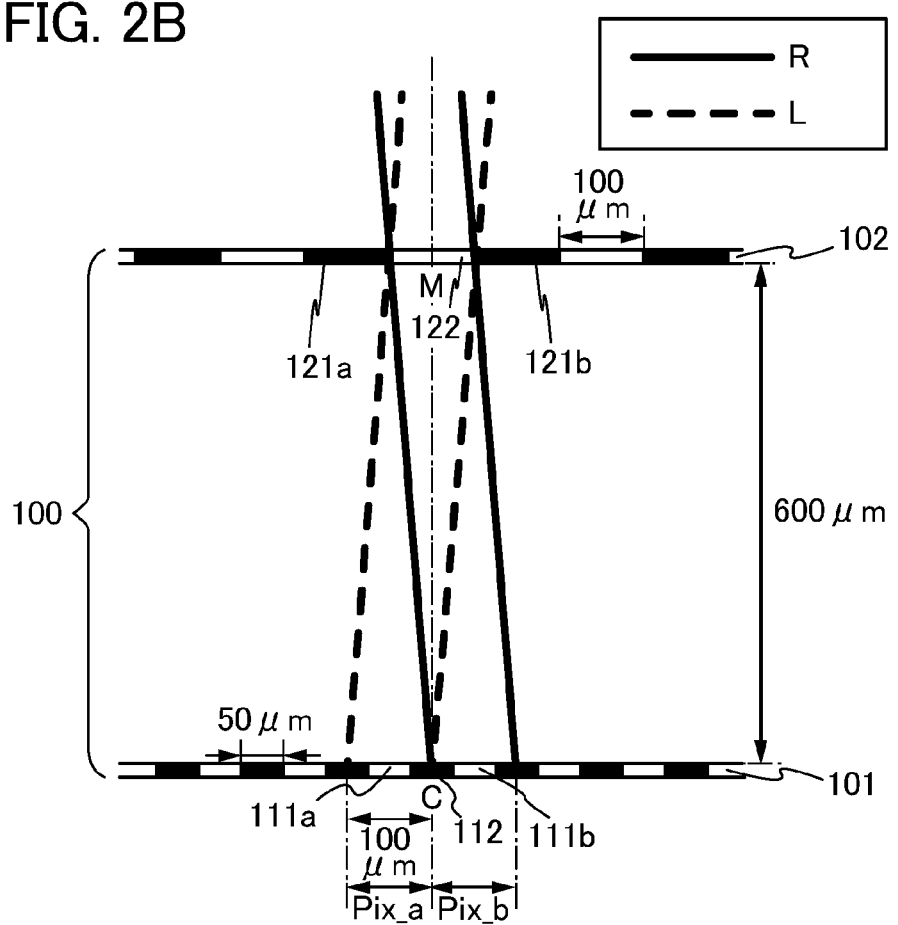

FIGS. 2A and 2B are schematic views under the following conditions: La is 6.5 cm, Lb is 39 cm, Rx is 4.8°, Ld is 600 µm, Lpix is 100 µm, Lslt is 100 µm, Lbm is 50 µm, a left-eye image is displayed on the display region 111a, and a right-eye image is displayed on the display region 111b.

In this case, as illustrated in FIG. 2B, light emitted from the display region 111b passes through a region which is sandwiched between two bold solid lines and indicates a viewing field of the right eye R, and light emitted from the display region 111a passes through a region which is sandwiched between two bold dotted lines and indicates the viewing field of the left eye L.

Figure 3A:
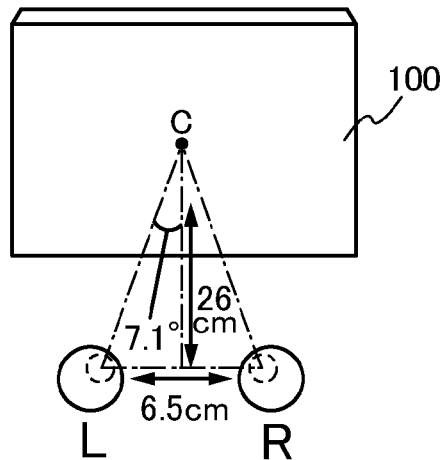
FIGS. 3A and 3B are diagrams illustrating an example of a display device according to Embodiment 1.
Figure 3B:
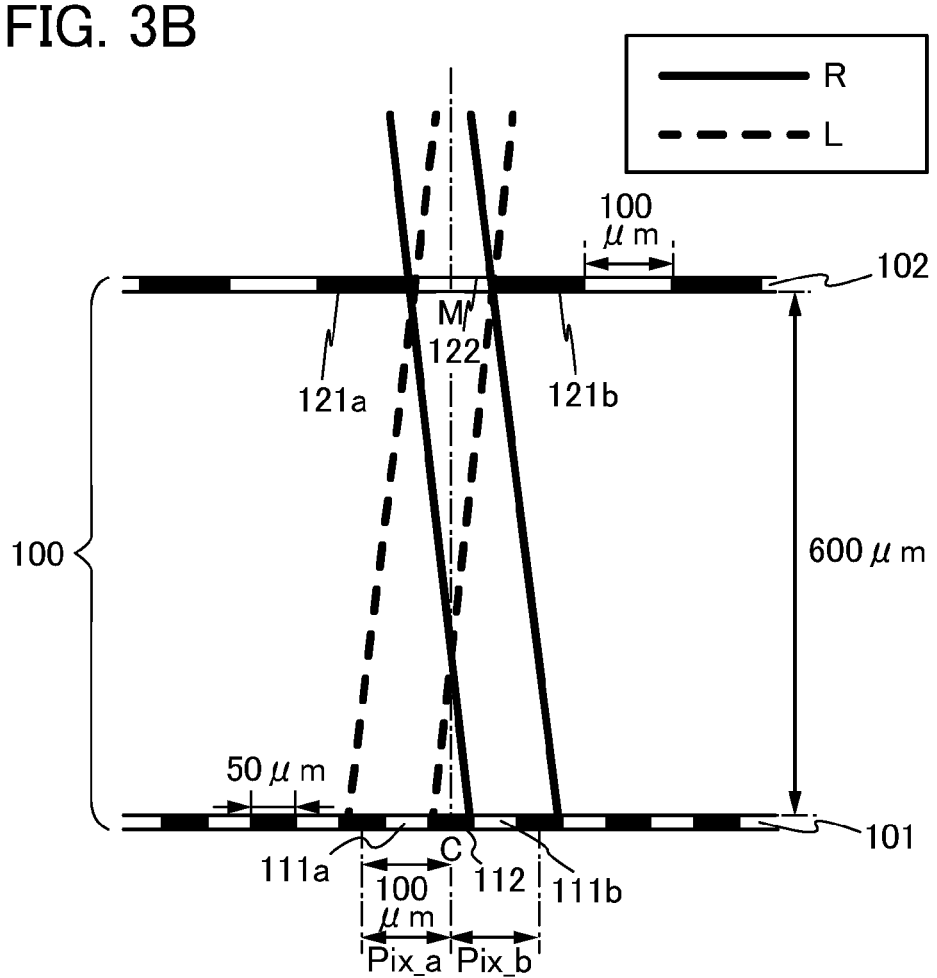

FIGS. 3A and 3B are schematic views under the following conditions: La is 6.5 cm, Lb is 26 cm, Rx is 7.1°, Ld is 600 µm, Lpix is 100 µm, Lslt is 100 µm, Lbm is 50 µm, a left-eye image is displayed on the display region 111a, and a right-eye image is displayed on the display region 111b.

Also in this case, as illustrated in FIG. 3B, light emitted from the display region 111b passes through a region which is sandwiched between two bold solid lines and indicates a viewing field of the right eye R, and light emitted from the display region 111a passes through a region which is sandwiched between two bold dotted lines and indicates a viewing field of the left eye L.

Figure 4A:
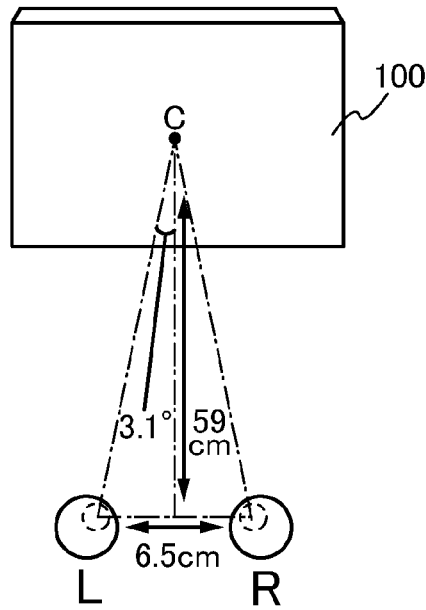
FIGS. 4A and 4B are diagrams illustrating an example of a display device according to Embodiment 1.
Figure 4B:
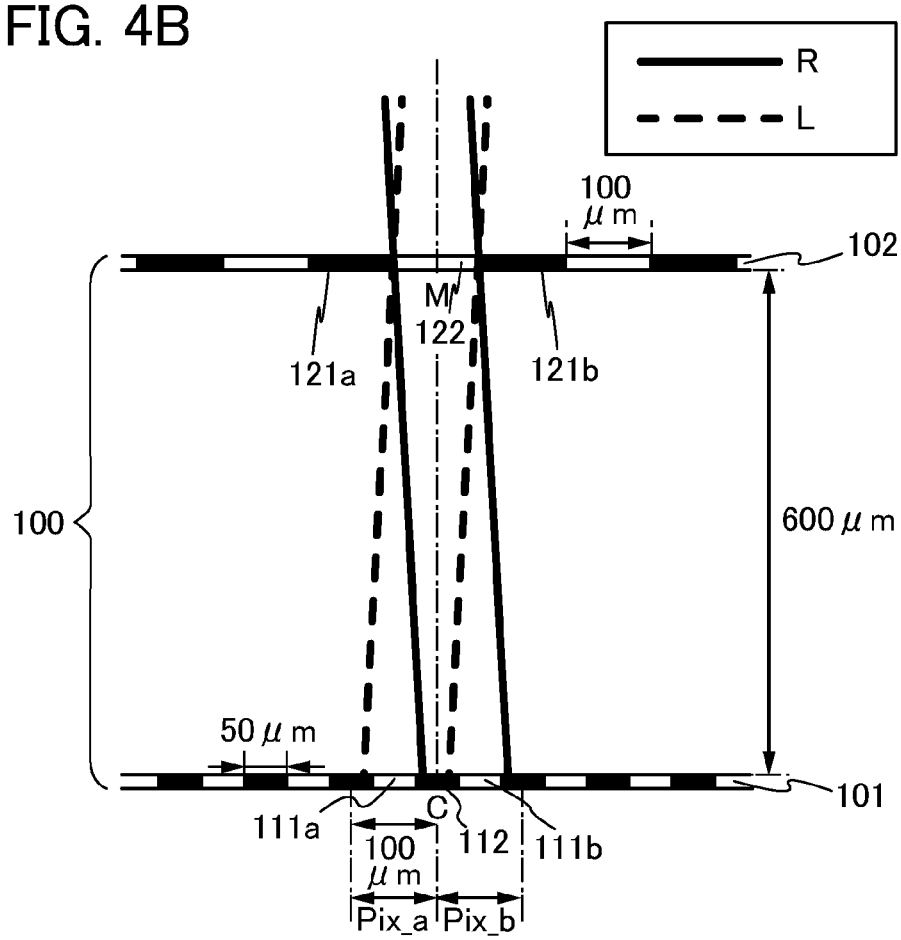

FIGS. 4A and 4B are schematic views under the following conditions: La is 6.5 cm, Lb is 59 cm, Rx is 3.1°, Ld is 600 µm, Lpix is 100 µm, Lslt is 100 µm, Lbm is 50 µm, a left-eye image is displayed on the display region 111a, and a right-eye image is displayed on the display region 111b.

Also in the case, as illustrated in FIG. 4B, light emitted from the display region 111b passes through a region which is sandwiched between two bold solid lines and indicates a viewing field of the right eye R, and light emitted from the display region 111a passes through a region which is sandwiched between two bold dotted lines and indicates a viewing field of the left eye L.

The foregoing has described the display device illustrated in FIGS. 1A and 1B.

As described above with reference to FIGS. 1A and 1B, FIGS. 2A and 2B, FIGS. 3A and 3B, and FIGS. 4A and 4B, in each of the examples of the display devices according to this embodiment, the non-light-emitting region whose width is within the predetermined range is provided to overlap with the center of the width of the light-transmitting region in the parallax barrier, whereby crosstalk can be suppressed even when the distance between a viewer and the display device 100 is changed. Thus, a range of the distance between the viewer and the display device, which enables the viewer to perceive a pseudo three-dimensional image, can be expanded.

Embodiment 2

In this embodiment, a structural example of a pixel portion in the display device described in the above embodiment will be described.

Structural examples of pixel portions in the display devices of this embodiment are described with reference to FIGS. 5A and 5B.

Figure 5A:
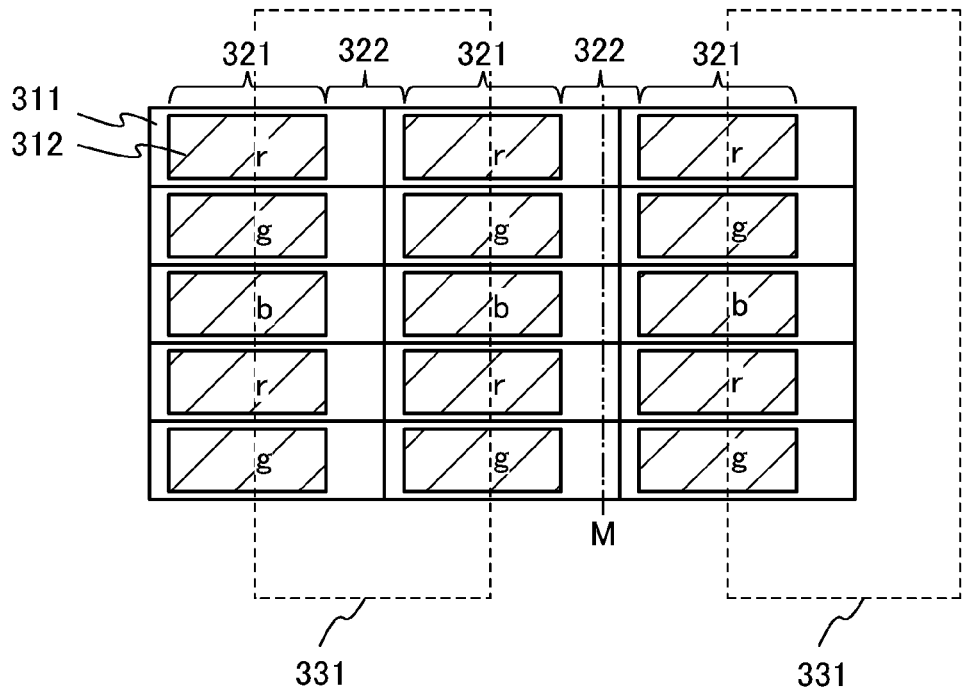
FIGS. 5A and 5B illustrate structural examples of a pixel portion in a display device according to Embodiment 2.

The pixel portion illustrated in FIG. 5A includes a plurality of pixels 311 of red (r), green (g), and blue (b) arranged in matrix. Note that in the pixel portion illustrated in FIG. 5A, the pixels of the same color are placed in the row direction. Further, the pixels in odd-numbered columns may have a function of pixels for the left eye, and the pixels in even-numbered columns may have a function of pixels for the right eye.

Figure 5B:
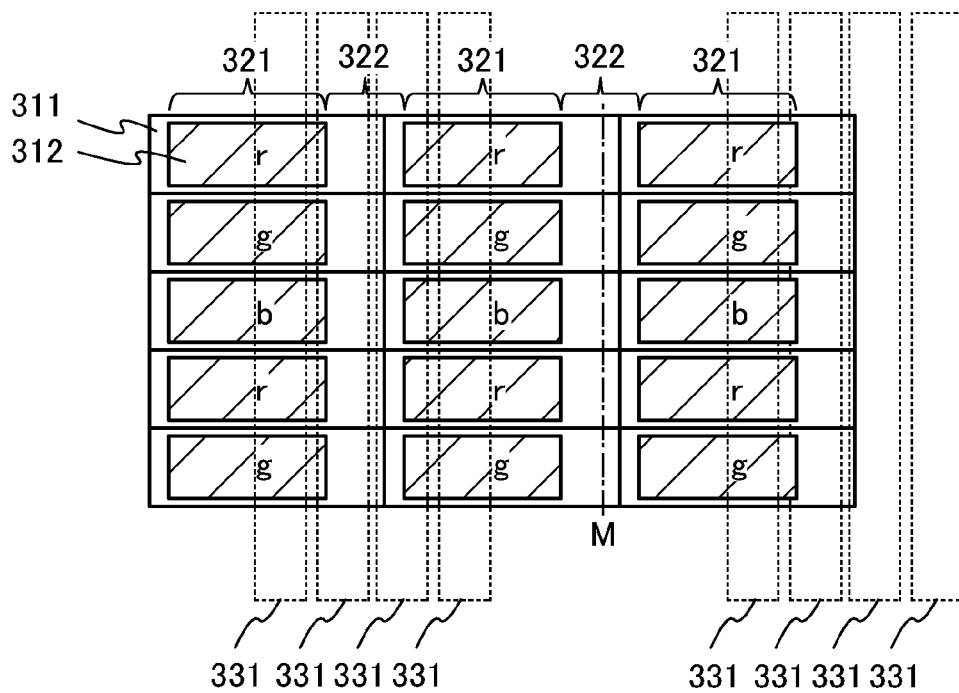

For example, a shape of each pixel 311 can be a rectangle as illustrated in FIGS. 5A and 5B, and the light control region 331 in the parallax barrier can have a slender shape as illustrated in FIGS. 5A and 5B. In this structure, the pixels 311 of red, blue, and green are orthogonal to the light control region 331 (a portion surrounded by a dotted line). When the pixels 311 of red, blue, green are orthogonal to the light control region 331, color shift in displayed images, caused by a viewing position, can be suppressed. Note that as illustrated in FIG. 5B, one light-blocking region may be formed using a plurality of light control regions 331.

Further, each of the plurality of pixels 311 is provided with a display electrode 312. A region provided with a display element including the display electrode 312 functions as a display region 321. Furthermore, a region between two adjacent display regions 321 in the same row functions as a non-light-emitting region 322. In this structure, as illustrated in FIGS. 5A and 5B, the center (M) of the light-transmitting region overlaps with the non-light-emitting region 322.

Next, an example of the circuit configuration of the pixel 311 is described with reference to FIGS. 6A to 6D. Note that a pixel illustrated as a circuit is referred to as a pixel circuit.

Figure 6A:
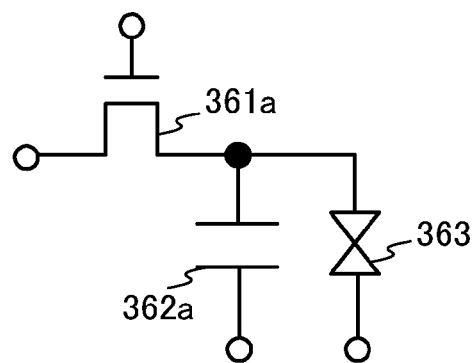
FIGS. 6A to 6D are diagrams for describing configuration examples of pixel circuits in display devices according to Embodiment 2.

A pixel circuit illustrated in FIG. 6A includes a transistor 361a, a capacitor 362a, and a liquid crystal element 363.

Note that in the pixel circuit illustrated in FIG. 6A, the transistor 361a is a field-effect transistor.

The liquid crystal element includes at least a first display electrode, a second display electrode, and a liquid crystal layer overlapping with the first display electrode and the second display electrode. The alignment of liquid crystal of the liquid crystal layer is controlled in accordance with a voltage applied between the first display electrode and the second display electrode.

A signal DD is input to one of a source and a drain of the transistor 361a, and a signal DSEL is input to a gate of the transistor 361a. The signal DSEL is a pulse signal which is input, for example, through a driver circuit such as a gate driver. The signal DD is an image data signal which is input, for example, through a driver circuit such as a source driver.

A first capacitor electrode of the capacitor 362a is electrically connected to the other of the source and the drain of the transistor 361a. The voltage Vc is applied to a second capacitor electrode of the capacitor 362a. Note that the capacitor 362a is not necessarily provided.

The first display electrode of the liquid crystal element 363 is electrically connected to the other of the source and the drain of the transistor 361a. The voltage Vc is applied to a second display electrode of the liquid crystal element 363. The level of the voltage Vc can be set as appropriate.

Figure 6B:
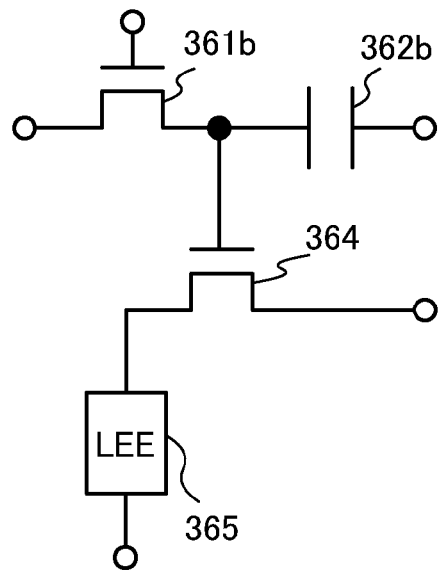

A pixel circuit illustrated in FIG. 6B includes a transistor 361b, a capacitor 362b, a transistor 364, and a light-emitting element (also referred to as LEE) 365.

Note that in the pixel circuit illustrated in FIG. 6B, the transistor 361b and the transistor 364 are field-effect transistors.

The light-emitting element includes a first current terminal, a second current terminal, and a light-emitting layer overlapping with the first current terminal and the second current terminal. The light-emitting element emits light when current flows between the first and second current terminals in accordance with a voltage applied between the first and second current terminals.

A signal DD is input to one of a source and a drain of the transistor 361b, and a signal DSEL is input to a gate of the transistor 361b.

The voltage Vb is applied to a first capacitor electrode of the capacitor 362b. A second capacitor electrode of the capacitor 362b is electrically connected to a gate of the transistor 364.

The voltage Va is applied to one of a source and a drain of the transistor 364. The gate of the transistor 364 is electrically connected to the other of the source and the drain of the transistor 361b.

The first current terminal of the light-emitting element 365 is electrically connected to the other of the source and the drain of the transistor 364. The voltage Vb is applied to the second current terminal of the light-emitting element 365.

Note that one of the voltage Va and the voltage Vb is a high power supply voltage Vdd, and the other is a low power supply voltage Vss. The value of the voltage Va and the value of the voltage Vb might interchange depending, for example, on the conductivity type of the transistor.

Further, the components of the pixel circuits illustrated in FIGS. 6A and 6B will be described.

The transistors 361a and 361b function as signal-input-selection transistors.

The capacitors 362a and 362b each function as a storage capacitor where voltage having a value corresponding to the signal DD is applied between the first capacitor electrode and the second capacitor electrode.

As the liquid crystal layer in the liquid crystal element 363, for example, a liquid crystal layer which makes the liquid crystal element 363 transmit light when a voltage applied between the first display electrode and the second display electrode is 0 V can be used. For example, it is possible to use a liquid crystal layer including electrically controlled birefringence liquid crystal (ECB liquid crystal), liquid crystal to which dichroic dye is added (GH liquid crystal), polymer-dispersed liquid crystal, or discotic liquid crystal. A liquid crystal layer exhibiting a blue phase may be used as the liquid crystal layer. The liquid crystal layer exhibiting a blue phase contains, for example, a liquid crystal composition including a liquid crystal exhibiting a blue phase and a chiral agent. The liquid crystal exhibiting a blue phase has a short response time of 1 msec or less, and is optically isotropic; thus, alignment treatment is not necessary and viewing angle dependence is small. Thus, with the liquid crystal exhibiting a blue phase, operation speed can be improved.

The transistor 364 is a driving transistor.

Note that each of the transistors 361*a*, 361*b*, and 364 can be, for example, a transistor including a semiconductor layer containing a semiconductor that belongs to Group 14 in the periodic table (e.g., silicon) or an oxide semiconductor layer in which a channel is formed.

Examples of an oxide semiconductor applicable to the above oxide semiconductor layer are In-based oxide (e.g., indium oxide), Sn-based oxide (e.g., tin oxide), and Zn-based oxide (e.g., zinc oxide).

As the metal oxide, a four-component metal oxide, a three-component metal oxide, or a two-component metal oxide can also be used, for example. Note that a metal oxide which can be used as the above oxide semiconductor may include gallium as a stabilizer for reducing variation in characteristics. A metal oxide which can be used as the above oxide semiconductor may include tin as a stabilizer. A metal oxide which can be used as the above oxide semiconductor may include hafnium as a stabilizer. A metal oxide which can be used as the above oxide semiconductor may include aluminum as a stabilizer. A metal oxide which can be used as the above oxide semiconductor may include one or more of following material as a stabilizer: lanthanum, cerium, praseodymium, neodymium, samarium, europium, gadolinium, terbium, dysprosium, holmium, erbium, thulium, ytterbium, and lutetium, which are lanthanoid. Further, the metal oxide that can be used as the oxide semiconductor may contain silicon oxide.

Examples of a four-component metal oxide are an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, and an In—Hf—Al—Zn-based oxide.

Examples of the three-component metal oxide include an In—Ga—Zn-based oxide, an In—Sn—Zn-based oxide, an In—Al—Zn-based oxide, a Sn—Ga—Zn-based oxide, an Al—Ga—Zn-based oxide, a Sn—Al—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, and an In—Lu—Zn-based oxide.

Examples of a two-component metal oxide are an In—Zn-based oxide, a Sn—Zn-based oxide, an Al—Zn-based oxide, a Zn—Mg-based oxide, a Sn—Mg-based oxide, an In—Mg-based oxide, an In—Sn-based oxide, and an In—Ga-based oxide.

An EL element, a light-emitting diode, a light-emitting transistor, or the like can be used as the light-emitting element 365. In the case of using an EL element, one of an anode and a cathode of the EL element corresponds to the first current terminal of the light-emitting element, and the other corresponds to the second current terminal of the light-emitting element.

Next, examples of methods for driving the pixel circuits illustrated in FIGS. 6A and 6B will be described.

Figure 6C:
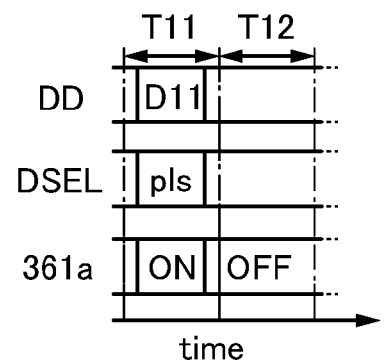

First, an example of the method for driving the pixel circuit illustrated in FIG. 6A is described with reference to FIG. 6C. FIG. 6C is a timing chart for describing the example of the method for driving the pixel circuit illustrated in FIG. 6A, and illustrates the states of the signal DD, the signal DSEL, and the transistor 361*a*.

In the example of the method for driving the pixel circuit in FIG. 6A, in a period T11, a pulse (also referred to as pls) of the signal DSEL is input, and the transistor 361*a* is set to an on state (also referred to as state ON).

When the transistor 361*a* is in the on state, the signal DD is input to the pixel circuit, and then the voltage of the first display electrode of the liquid crystal element 363 and the voltage of the first capacitor electrode of the capacitor 362*a* become equivalent to the voltage of the signal DD (a voltage D11 here).

At this time, liquid crystal in the liquid crystal element 363 is aligned in accordance with the signal DD, so that the pixel circuit is placed in a display state corresponding to data of the signal DD.

In addition, after the input of the pulse of the signal DSEL ends, the transistor 361*a* is set to an off state (state OFF). Then, during a period T12, the pixel circuit holds the display state corresponding to the voltage D11.

Figure 6D:
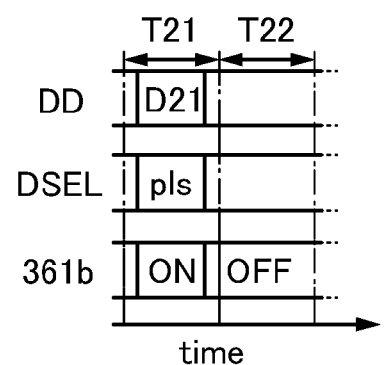

Next, the example of the method for driving the pixel circuit illustrated in FIG. 6B is described with reference to FIG. 6D. FIG. 6D is a timing chart for describing the example of the method for driving the pixel circuit illustrated in FIG. 6B, and illustrates the states of the signal DD, the signal DSEL, and the transistor 361*b*.

In the example of the method for driving the pixel circuit in FIG. 6B, in a period T21, a pulse of the signal DSEL is input, and the transistor 361*b* is set to an on state.

When the transistor 361*b* is in the on state, the signal DD is input to the pixel circuit, and then the voltage of the gate of the transistor 364 and the voltage of the second capacitor electrode of the capacitor 362*b* become equivalent to the voltage of the signal DD (a voltage D21 here, for example).

At this time, current flows between the source and the drain of the transistor 364 in accordance with the voltage of the gate of the transistor 364, and current flows between the first current terminal and the second current terminal of the light-emitting element 365, so that the light-emitting element 365 emits light. At this time, the voltage of the first current terminal of the light-emitting element 365 becomes a value corresponding to the voltage of the signal DD (here, the voltage D21) and the luminance of the light-emitting element 365 becomes a value corresponding to the voltage Vb and the voltage of the first current terminal set in accordance with the signal DD.

In addition, after the input of the pulse of the signal DSEL ends, the transistor 361*b* is set to an off state. Then, during a period T22, the pixel circuit holds the display state corresponding to the voltage D21. That is the example of the driving method of the pixel circuit illustrated in FIG. 6B.

A structural example of a display device in this embodiment will be described. Note that as an example, the pixel circuit has a circuit configuration illustrated in FIG. 6B.

A display device in this embodiment includes a first substrate where a semiconductor element such as a transistor is provided (the substrate is also referred to as an active matrix substrate), a second substrate, and a light-emitting element provided between the first substrate and the second substrate.

Figure 7A:
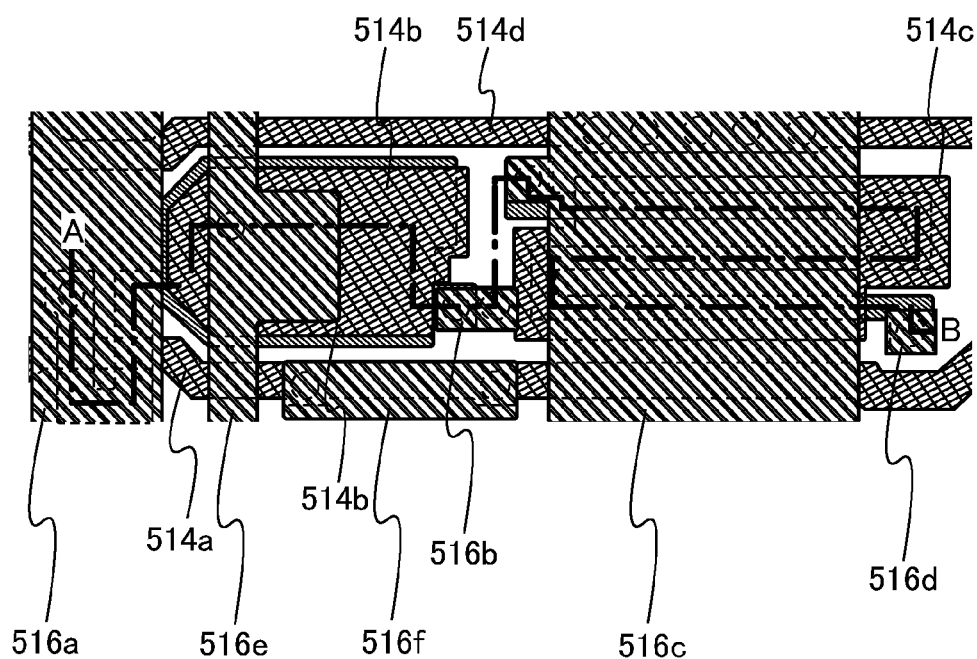
FIGS. 7A and 7B are a schematic plan view and a schematic cross-sectional view illustrating a structural example of an active matrix substrate in a display device according to Embodiment 2.
Figure 7B:
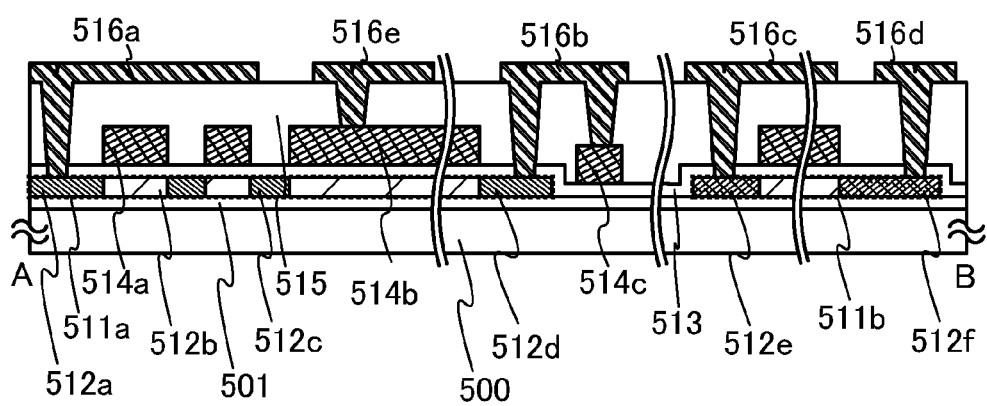

A structural example of the active matrix substrate in the display device of this embodiment is described with reference to FIGS. 7A and 7B. FIGS. 7A and 7B illustrate a structural example of an active matrix substrate in the display device of this embodiment. FIG. 7A is a schematic plan view, and FIG. 7B is a schematic cross-sectional view taken along line A-B in FIG. 7A. Note that the components illustrated in FIGS. 7A and 7B include those having sizes different from the actual sizes. For convenience, in FIG. 7B, part of cross section along line A-B of FIG. 7A is not shown.

The active matrix substrate illustrated in FIGS. 7A and 7B includes a substrate 500, an insulating layer 501, semiconductor layers 511a and 511b, an insulating layer 513, conductive layers 514a to 514d, an insulating layer 515, and conductive layers 516a to 516f.

Each of the semiconductor layers 511a and 511b is provided over one plane of the substrate 500 with the insulating layer 501 interposed therebetween.

The semiconductor layer 511a includes impurity regions 512a to 512d containing an impurity element imparting a p-type conductivity or an n-type conductivity. The semiconductor layer 511a functions as a layer in which a channel of a signal-input-selection transistor in the pixel circuit is formed (also referred to as a channel formation layer) and as the second capacitor electrode of the storage capacitor in the pixel circuit.

Note that in the semiconductor layer 511a, channel formation regions of a signal-input-selection transistor in the pixel circuit are provided between the impurity region 512a and the impurity region 512b and between the impurity region 512b and the impurity region 512c.

The semiconductor layer 511b includes an impurity region 512e and an impurity region 512f containing an impurity element imparting a p-type conductivity or an n-type conductivity. The semiconductor layer 511b functions as a channel formation layer in a driving transistor of the pixel circuit.

Note that in the semiconductor layer 511b, a channel formation region of the driving transistor in the pixel circuit is provided between the impurity region 512e and the impurity region 512f.

The insulating layer 513 is provided over the semiconductor layers 511a and 511b. The insulating layer 513 functions as gate insulating layers of the signal-input-selection transistor and the driving transistor in the pixel circuit, and a dielectric layer of a storage capacitor in the display circuit.

The conductive layer 514a overlaps with part of the semiconductor layer 511a with the insulating layer 513 provided therebetween. Note that a region of the semiconductor layer 511a which overlaps with the conductive layer 514a functions as the channel formation region of the signal-input-selection transistor in the pixel circuit. The conductive layer 514a functions as a gate of the signal-input-selection transistor in the pixel circuit. Note that in FIGS. 7A and 7B, the conductive layer 514a overlaps with part of the semiconductor layer 511a at a plurality of portions. The conductive layer 514a does not necessarily overlap with part of the semiconductor layer 511a at a plurality of portions, but the switching characteristics of the signal-input-selection transistor in the pixel circuit can be improved when the conductive layer 514a overlaps with part of the semiconductor layer 511a at a plurality of portions. Note that the region of the semiconductor layer 511a which overlaps with the conductive layer 514a may contain an impurity element imparting a p-type or n-type conductivity, the concentration of which is lower than that of the impurity element in the impurity regions 512a to 512d provided in the semiconductor layer 511a.

The conductive layer 514b is over and overlaps with part of the semiconductor layer 511a with the insulating layer 513 provided therebetween. The conductive layer 514b functions as a first capacitor electrode of the storage capacitor in the pixel circuit. Note that a region of the semiconductor layer 511a which overlaps with the conductive layer 514b may contain an impurity element imparting a p-type or n-type conductivity, the concentration of which is lower than that of the impurity element in the impurity regions 512a to 512d.

The conductive layer 514c overlaps with part of the semiconductor layer 511b with the insulating layer 513 provided therebetween. The conductive layer 514c functions as a gate of the driving transistor in the pixel circuit.

The conductive layer 514d extends to a plurality of pixel circuit in the row direction. The conductive layer 514d functions as a power supply line through which the voltage Vb is supplied.

The insulating layer 515 is provided over the insulating layer 513 and the conductive layers 514a to 514d.

The conductive layer 516a is electrically connected to the impurity region 512a through a first opening formed in the insulating layer 513 and the insulating layer 515. The conductive layer 516a functions as one of a source and a drain of the signal-input-selection transistor in the pixel circuit and a wiring to which a display data signal is input.

The conductive layer 516b is electrically connected to the impurity region 512d through a second opening formed in the insulating layer 513 and the insulating layer 515 and also electrically connected to the conductive layer 514c through a third opening formed in the insulating layer 515. The conductive layer 516b functions as the other of the source and the drain of the signal-input-selection transistor in the pixel circuit.

The conductive layer 516c is electrically connected to the impurity region 512e through a fourth opening formed in the insulating layer 513 and the insulating layer 515 and also electrically connected to the conductive layer 514d through a fifth opening formed in the insulating layer 515. The conductive layer 516c functions as one of a source and a drain of the driving transistor in the pixel circuit and a power supply line through which the voltage Va is supplied.

The conductive layer 516d is electrically connected to the impurity region 512f through a sixth opening formed in the insulating layer 513 and the insulating layer 515. The conductive layer 516d functions as the other of the source and the drain of the driving transistor in the pixel circuit.

The conductive layer 516e is electrically connected to the conductive layer 514b through a seventh opening formed in the insulating layer 515. The conductive layer 516e functions as a capacitor line of the storage capacitor in the pixel circuit.

The conductive layer 516f is electrically connected to the conductive layer 514a through an eighth opening and a ninth opening formed in the insulating layer 515. The conductive layer 516f contributes to a reduction in wiring resistance.

Figure 8:
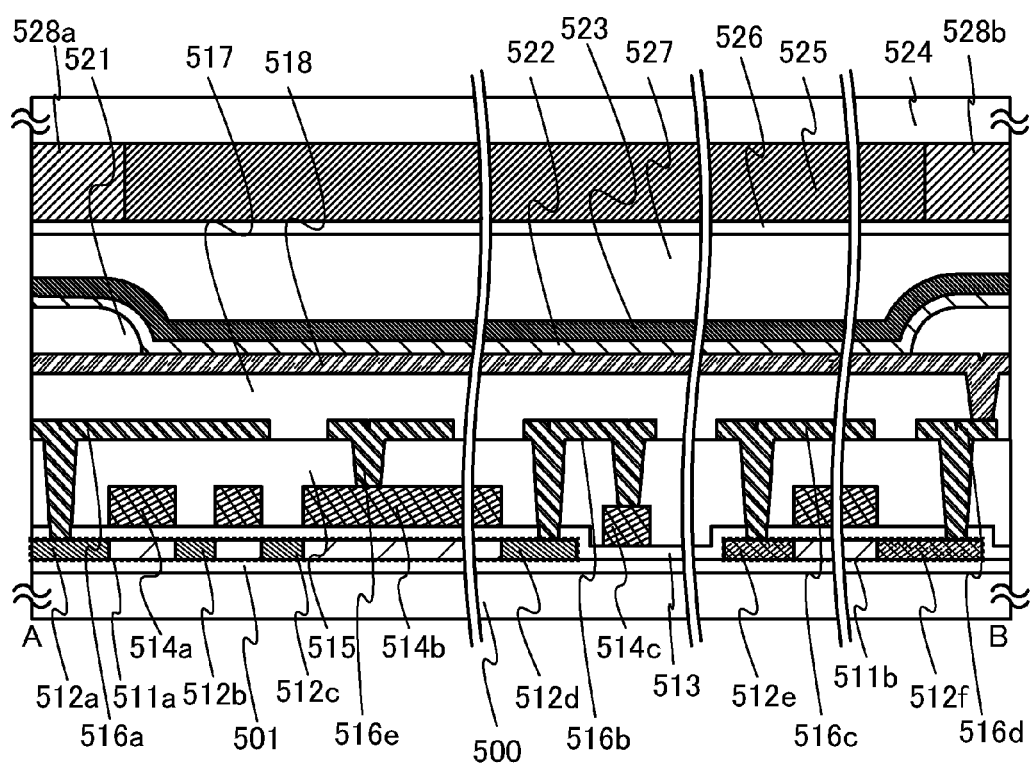
FIG. 8 is a schematic cross-sectional view illustrating a structural example of a display device according to Embodiment 2.

A structural example of a display device in this embodiment is described with reference to FIG. 8. FIG. 8 is a cross-sectional schematic view illustrating a structural example of the display device of this embodiment. Note that in this embodiment, a light-emitting element in the display device emits light toward the top surface side of the display device; however, structures of display devices according to the present invention are not limited thereto. The display device may emit light toward the bottom surface side.

The display device illustrated in FIG. 8 includes an insulating layer 517, a conductive layer 518, an insulating layer 521, a light-emitting layer 522, a conductive layer 523, a substrate 524, a coloring layer 525, an insulating layer 526, an insulating layer 527, a light-blocking layer 528a, and a light-blocking layer 528b in addition to the active matrix substrate illustrated in FIGS. 7A and 7B.

The insulating layer 517 is provided over the insulating layer 515 and the conductive layers 516a to 516f.

The conductive layer 518 is provided over the insulating layer 517 and is electrically connected to the conductive layer 516d through a tenth opening in the insulating layer 517. The conductive layer 518 functions as the first electrode (first current terminal) of the light-emitting element in the pixel circuit.

The insulating layer 521 is provided over the conductive layer 518.

The light-emitting layer 522 is provided over the insulating layer 521 and is electrically connected to the conductive layer 518 through an eleventh opening formed in the insulating layer 521. The light-emitting layer 522 functions as a light-emitting layer of the light-emitting element in the pixel circuit.

The conductive layer 523 is provided over and is electrically connected to the light-emitting layer 522. The conductive layer 523 functions as the second electrode (second current terminal) of the light-emitting element in the light pixel circuit.

The coloring layer 525 is provided on one plane of the substrate 524 so as to transmit light with a specific wavelength which is emitted from the light-emitting layer 522.

The light-blocking layers 528a and 528b are provided on one plane of the substrate 524. The light-blocking layers 528a and 528b occupies part or whole of the non-light-emitting region in the display device in the above embodiment. Note that the light-blocking layers 528a and 528b are not necessarily provided.

The insulating layer 526 is provided on one plane side of the substrate 524 with the coloring layer 525 and the light-blocking layers 528a and 528b interposed therebetween.

The insulating layer 527 is provided between the insulating layer 526 and the conductive layer 523.

The components of the display device described with reference to FIGS. 7A and 7B and FIG. 8 are described.

A glass substrate or a plastic substrate, for example, can be used for the substrates 500 and 524. Note that the substrates 500 and 524 are not necessarily provided.

As the insulating layer 501, a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, or a hafnium oxide layer can be used, for example. For example, a silicon oxide layer, a silicon oxynitride layer, or the like can be used as the insulating layer 501. In addition, the oxide insulating layer may contain halogen. The insulating layer 501 can be a stack of layers of materials that can be used for the insulating layer 501. The insulating layer 501 is not necessarily provided.

The semiconductor layers 511a and 511b can be, for example, a layer containing an amorphous semiconductor, a microcrystalline semiconductor, a polycrystalline semiconductor, or a single crystal semiconductor. A semiconductor layer containing a semiconductor belonging to Group 14 of the periodic table (e.g., silicon) can be used as the semiconductor layers 511a and 511b. Further, the semiconductor layers 511a and 511b are not limited thereto, and an oxide semiconductor layer can be used for example.

The insulating layer 513 can be a layer of a material which can be used for the insulating layer 501. The insulating layer 513 can be a stack of materials which can be used for the insulating layer 513.

A layer formed using a metal material such as molybdenum, titanium, chromium, tantalum, magnesium, silver, tungsten, aluminum, copper, neodymium, or scandium can be used for the conductive layers 514a to 514d. Further, a layer containing a conductive metal oxide can be used as the conductive layers 514a to 514d. As the conductive metal oxide, a metal oxide such as indium oxide ($In_2O_3$), tin oxide ($SnO_2$), zinc oxide (ZnO), an alloy of indium oxide and tin oxide ($In_2O_3$—$SnO_2$, which is abbreviated to ITO in some cases), or an alloy of indium oxide and zinc oxide ($In_2O_3$—ZnO) can be used, for example. Further, a material in which silicon, silicon oxide, or nitrogen is added to the metal oxide can be used. The conductive layers 514a to 514d can also be formed by stacking layers of materials which can be applied to the conductive layers 514a to 514d. The conductive layers 514a to 514d can be a stack of a tantalum nitride layer and a tungsten layer, for example.

The insulating layer 515 can be a layer of a material which can be used for the insulating layer 501. Alternatively, the insulating layer 515 can be formed using a stack of materials that can be used for the insulating layer 515. For example, the insulating layer 515 can be a stack of a silicon nitride oxide layer and a silicon oxynitride layer.

Each of the conductive layers 516a to 516f can be a layer of a material which can be used for the conductive layer 514a to 514d, for example. Each of the conductive layers 516a to 516f can be a stack of materials which can be used for the conductive layers 516a to 516f. For example, each of the conductive layers 516a to 516f can be a stack of a titanium layer, an aluminum layer, and a titanium layer. Note that side surfaces of each of the conductive layers 516a to 516f may be tapered.

The insulating layer 517 can be a layer of a material which can be used for the insulating layer 513, for example. The insulating layer 517 can be a stack of materials which can be used for the insulating layer 517.

The conductive layer 518 can be a layer of a material which can be used for the conductive layer 514a to 514d, for example. A stack of layers of materials applicable to the conductive layer 518 can be used as the conductive layer 518.

The insulating layer 521 can be an organic insulating layer or an inorganic insulating layer, for example. Note that the insulating layer 521 is also referred to as a partition.

The light-emitting layer 522 is a layer which emits light of single color that is a specific color. As the light-emitting layer 522, for example, a light-emitting layer using a light-emitting material which emits light of specific one color can be used. The light-emitting layer 522 can also be formed using a stack of light-emitting layers which emit light of different colors. The light-emitting material can be an electroluminescent material such as a fluorescent material or a phosphorescent material. Alternatively, the light-emitting material can be a material containing a plurality of electroluminescent materials. A light-emitting layer emitting white light may be formed with a stack of a layer of a fluorescent material emitting blue light, a layer of a first phosphorescent material emitting orange light, and a layer of a second phosphorescent material emitting orange light, for example. Alternatively, the electroluminescent material can be an organic electroluminescent material or an inorganic electroluminescent material. Alternatively, the light-emitting layer may be formed using, for example, in addition to the above-described light-emitting layer, one or more of the following layers: a hole-injection layer, a hole-transport layer, an electron-transport layer, and an electron-injection layer.

The conductive layer 523 can be a layer of a light-transmitting material selected from the materials which can be used for the conductive layers 514a to 514d. Alternatively, the conductive layer 523 can be a stack of materials which can be used for the conductive layer 523.

The coloring layer 525 can be a layer which contains dye or pigment, for example, and which transmits light with the wavelength range of red, light with the wavelength range of green, or light with the wavelength range of blue. Alternatively, the coloring layer 525 can be a layer which transmits cyan light, magenta light, or yellow light and which contains dye or pigment. When containing dye, the coloring layer 525 is formed by a photolithography method, a printing method, or an inkjet method, for example. When containing pigment, the coloring layer 525 is formed by a photolithography method, a printing method, an electrodeposition method, an electrophotographic method, or the like. By using an inkjet method, for example, the coloring layer can be manufactured at room temperature, manufactured at a low vacuum, or formed over a large substrate. Since the coloring layer can be manufactured without a resist mask, manufacturing cost and the number of steps can be reduced.

The insulating layer 526 can be a layer of a material which can be used for the insulating layer 501. The insulating layer 526 can be a stack of materials which can be used for the insulating layer 526. Note that the insulating layer 526 is not necessarily provided, but providing the insulating layer 526 can suppress the entry of an impurity from the coloring layer 525 to the light-emitting element.

The insulating layer 527 can be a layer of a material which can be used for the insulating layer 501 or a layer of a resin material. The insulating layer 527 can be a stack of materials which can be used for the insulating layer 527.

As the light-blocking layers 528a and 528b, for example, a layer formed using an inorganic material with light-blocking properties or the like can be used.

As described with reference to FIGS. 5A and 5B, FIGS. 6A to 6D, FIGS. 7A and 7B, and FIG. 8, in the example of the pixel portion in the display device of this embodiment, pixels of same color are arranged in the row direction, and pixels of different colors are arranged in the column direction, and the light control region of the parallax barrier is provided orthogonal to the pixels. With such a structure, color shift of images caused by a viewing position can be suppressed.

The example of the display device in this embodiment includes a light-emitting element emitting light of a single specific color, and a coloring layer which transmits light with a particular wavelength emitted from the light-emitting element. This structure enables a full-color image to be displayed without forming a plurality of light-emitting elements emitting light of different colors, thereby facilitating the manufacturing process and enhancing yield. For example, a display element can be formed without a metal mask, and therefore, a manufacturing process can be simple. Further, contrast of an image can be improved.

Further, in the example of the display device in this embodiment, a driver circuit may be provided over the substrate over which the pixel circuit is provided. In this case, the transistor in the circuit such as a driver circuit may have the same structure as the transistor in the pixel circuit. A circuit such as the driver circuit is provided over the same substrate as the pixel circuit, so that the number of connection wirings of the pixel circuit and the driver circuit can be reduced.

Furthermore, by using an EL display device as the example of the display device in this embodiment, even when the area of the non-light-emitting region is large, an increase in power consumption can be suppressed. This is because in the EL display device, when the area of the display region is reduced due to the non-light-emitting region, the current density per unit area is increased, and accordingly emission luminance is less decreased. Thus, for example, the center of the width of the light-transmitting region is provided to overlap with the non-light-transmitting region (preferably, the central portion of the non-light-emitting region), and the width of the non-light-emitting region is set within the above range, whereby an increase in power consumption is suppressed and crosstalk can be reduced.

Embodiment 3

In this embodiment, examples of electronic devices each provided with the display device of the above embodiments will be described.

Structural examples of electronic devices in this embodiment are described with reference to FIGS. 9A to 9D. FIGS. 9A to 9D are schematic views of structural examples of electronic devices of this embodiment.

Figure 9A:
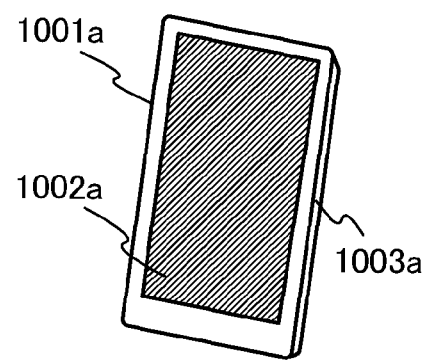
FIGS. 9A to 9D each illustrate an electronic device in Embodiment 3.

The electronic device illustrated in FIG. 9A is an example of a personal digital assistant. The personal digital assistant in FIG. 9A includes a housing 1001a and a display portion 1002a provided in the housing 1001a.

Note that a side surface 1003a of the housing 1001a may be provided with one of or both a connection terminal for connecting the personal digital assistant to an external device and a button for operating the personal digital assistant illustrated in FIG. 9A.

In the housing 1001a of the personal digital assistant illustrated in FIG. 9A, a CPU, a main memory, an interface with which signals are transmitted/received between the external device, the CPU and the main memory, and an antenna which transmits and receives the signals to/from the external device are provided. Note that in the housing 1001a, one or plural integrated circuits having a specific function may be provided.

Further, the display device of one embodiment of the present invention is used for the display portion 1002a, whereby a pseudo three-dimensional image can be displayed.

The personal digital assistant illustrated in FIG. 9A functions as one or more of a telephone set, an e-book reader, a personal computer, and a game machine, for example.

Figure 9C:
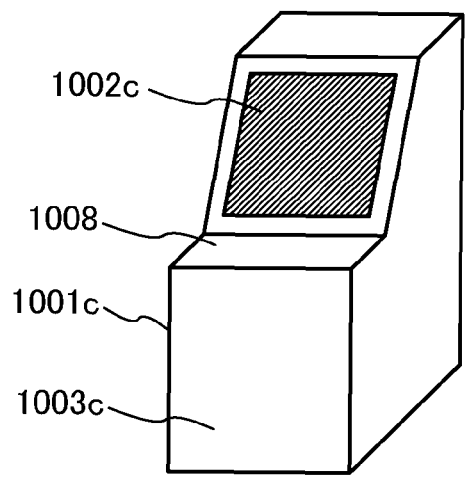
Figure 9B:
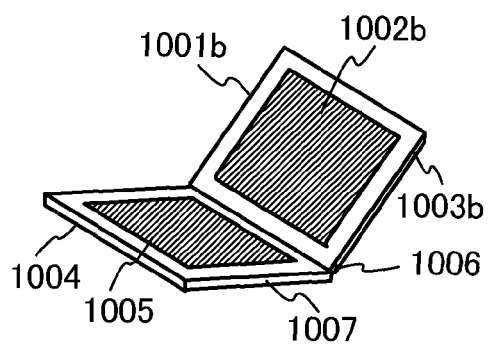

The electronic device illustrated in FIG. 9B is an example of a folding personal digital assistant. The personal digital assistant illustrated in FIG. 9B includes a housing 1001b, a display portion 1002b provided in the housing 1001b, a housing 1004, a display portion 1005 provided in the housing 1004, and a hinge 1006 for connecting the housing 1001b and the housing 1004.

In the personal digital assistant illustrated in FIG. 9B, the housing 1001b can be stacked on the housing 1004 by moving the housing 1001b or the housing 1004 with the hinge 1006.

Note that a side surface 1003b of the housing 1001b or a side surface 1007 of the housing 1004 may be provided with one of or both a connection terminal for connecting the personal digital assistant to an external device and a button for operating the personal digital assistant illustrated in FIG. 9B.

The display portion 1002b and the display portion 1005 may display different images or one image. Note that the display portion 1005 is not necessarily provided, and a keyboard which is an input device may be provided instead of the display portion 1005.

The personal digital assistant in FIG. 9B includes in the housing 1001b or the housing 1004, a CPU, a main memory, and an interface with which signals are transmitted/received between the external device, the CPU, and the main memory. Note that in the housing 1001b or the housing 1004, one or plural integrated circuits having a specific function may be provided. Note that the personal digital assistant illustrated in FIG. 9B may be provided with an antenna for transmitting and receiving a signal to/from the external device.

Further, the display device of one embodiment of the present invention is used for at least one of the display portion 1002b and the display portion 1005, whereby a pseudo three-dimensional image can be displayed.

The personal digital assistant illustrated in FIG. 9B functions as one or more of a telephone set, an e-book reader, a personal computer, and a game machine, for example.

The electronic device illustrated in FIG. 9C is an example of a stationary information terminal. The stationary information terminal illustrated in FIG. 9C includes a housing 1001c and a display portion 1002c provided in the housing 1001c.

Note that the display portion 1002c can be provided on a deck portion 1008 of the housing 1001c.

The stationary information terminal in FIG. 9C includes in the housing 1001c, a CPU, a main memory, and an interface with which signals are transmitted/received between the external device, the CPU, and the main memory. Note that in the housing 1001c, one or plural integrated circuits having a specific function may be provided. Note that the stationary information terminal illustrated in FIG. 9C may be provided with an antenna for transmitting and receiving a signal to/from the external device.

Further, a side surface 1003c of the housing 1001c in the stationary information terminal illustrated in FIG. 9C may be provided with one or more of a ticket output portion that outputs a ticket or the like, a coin slot, and a bill slot.

Further, the display device of one embodiment of the present invention is used for the display portion 1002c, whereby a pseudo three-dimensional image can be displayed.

The stationary information terminal illustrated in FIG. 9C functions as an automated teller machine, an information communication terminal (also referred to as a multimedia station) for ordering a ticket or the like, or a game machine, for example.

Figure 9D:
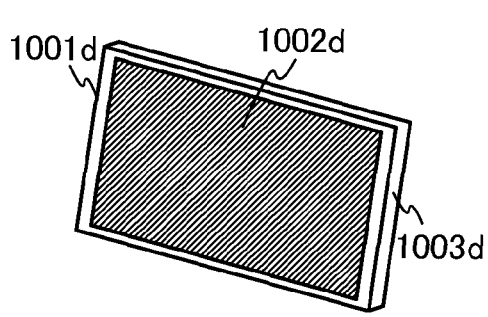

The electronic device illustrated in FIG. 9D is an example of a stationary information terminal. The stationary information terminal illustrated in FIG. 9D includes a housing 1001d and a display portion 1002d provided in the housing 1001d. Note that a support for supporting the housing 1001d may also be provided.

Note that a side surface 1003d of the housing 1001d may be provided with a connection terminal for connecting the stationary information terminal to an external device and/or a button for operating the stationary information terminal illustrated in FIG. 9D.

The stationary information terminal illustrated in FIG. 9D may also include, in the housing 1001d, a CPU, a main memory, and an interface with which signals are transmitted/received between the external device, the CPU, and the main memory. Further, in the housing 1001d, one or plural integrated circuits having a specific function may be provided. Note that the stationary information terminal illustrated in FIG. 9D may be provided with an antenna for transmitting and receiving a signal to and from the external device.

Further, the display device of one embodiment of the present invention is used for the display portion 1002d, whereby a pseudo three-dimensional image can be displayed.

The stationary information terminal illustrated in FIG. 9D functions, for example, as a digital photo frame, an output monitor, or a television set.

The display device described in the above embodiments is used for a display portion of an electronic device, and for example, used for the display portions 1002a to 1002d illustrated in FIGS. 9A to 9D. Further, the display device of the above embodiments may be used for the display portion 1005 illustrated in FIG. 9B.

As described with reference to FIGS. 9A to 9D, the example of the electronic device of this embodiment has a structure in which the display portion including the display device described in the above embodiments is provided. With such a structure, an image on the display portion can be seen as a pseudo three-dimensional image.

In addition, in the examples of electronic devices of this embodiment, the housings may be each provided with one or more of a photoelectric conversion portion which generates power supply voltage in accordance with incident illuminance of light and an operation portion for operating the display device. For example, when the photoelectric conversion portion is provided, an external power supply is not needed; thus, the electronic device can be used for a long time even in an environment where an external power supply is not provided.

This application is based on Japanese Patent Application serial no. 2011-156196 filed with Japan Patent Office on Jul. 15, 2011, the entire contents of which are hereby incorporated by reference.

What is claimed is:

1. A display device comprising:
   a pixel portion comprising:
      first pixels in a first column over a first substrate;
      second pixels in a second column adjacent to the first column over the first substrate;
      a light-blocking layer on one surface of a second substrate which faces the first substrate; and
      a coloring layer on the one surface of the second substrate,
   wherein the light-blocking layer is provided along a boundary between the first column and the second column,
   wherein a width of the light-blocking layer in a row direction is greater than or equal to 30% and less than or equal to 70% of a width of a pixel in the row direction; and
   a parallax barrier comprising:
      a first light control region;
      a second light control region; and
      a light-transmitting region between the first light control region and the second light control region,
   wherein the first light control region overlaps with the first pixels,
   wherein the second light control region overlaps with the second pixels,
   wherein the light-transmitting region overlaps with the first pixels and the second pixels, and
   wherein a center line of the light-transmitting region overlaps with and extends along a central portion of the light-blocking layer.

2. The display device according to claim 1, wherein the width of the light-blocking layer in the row direction is 50% of the width of the pixel in the row direction.

3. The display device according to claim 1, wherein the display device is an electroluminescence display device.

4. The electroluminescence display device according to claim 3 comprising a transistor comprising an oxide semiconductor layer.

5. The display device according to claim 1, wherein the first pixels display an image for a left eye, and the second pixels display an image for a right eye.

6. The display device according to claim 1, wherein each of the first light control region and the second light control region is a light-blocking region.

7. A display device comprising:
a pixel portion comprising:
- first pixels in a first column over a first substrate;
- second pixels in a second column adjacent to the first column over the first substrate;
- a light-blocking layer on one surface of a second substrate which faces the first substrate; and a coloring layer on the one surface of the second substrate,
wherein the light-blocking layer is provided along a boundary between the first column and the second column,
wherein a width of the light-blocking layer in a row direction is greater than or equal to 30% and less than or equal to 70% of a width of a pixel in the row direction; and
a parallax barrier comprising:
- a first group of light control regions;
- a second group of light control regions; and
- a light-transmitting region between the first group of light control regions and the second group of light control regions, wherein one light control region of the first group of light control regions overlaps with the first pixels,
wherein one light control region of the second group of light control regions overlaps with the second pixels,
wherein the light-transmitting region overlaps with the first pixels and the second pixels, and
wherein a center line of the light-transmitting region overlaps with and extends along a central portion of the light-blocking layer.

8. The display device according to claim 7, wherein the width of the light-blocking layer in the row direction is 50% of the width of the pixel in the row direction.

9. The display device according to claim 7, wherein the display device is an electroluminescence display device.

10. The electroluminescence display device according to claim 9 comprising a transistor comprising an oxide semiconductor layer.

11. The display device according to claim 7, wherein the first pixels display an image for a left eye, and the second pixels display an image for a right eye.

12. The display device according to claim 7, wherein each light control region of the first group of light control regions and the second group of light control regions is a light-blocking region.

* * * * *